3,497,521
PREPARATION OF POLYVINYL ACETATE ADHESIVE EMULSIONS

Marcel Bouchard, Shawinigan, Quebec, Canada, assignor to Gulf Oil Canada Limited, Toronto, Ontario, Canada, a corporation of Canada
No Drawing. Filed Mar. 6, 1967, Ser. No. 620,629
Int. Cl. C08f 1/13, 3/56
U.S. Cl. 260—29.6      11 Claims

ABSTRACT OF THE DISCLOSURE

Process for the polymerization of vinyl acetate in aqueous emulsion using water soluble partially hydrolyzed polyvinyl acetate as emulsifying agent and, as polymerization initiator, a combination of (1) a specific water soluble redox polymerization initiator (hydrogen peroxide and zinc formaldehyde sulfoxylate) dissolved in the aqueous phase of the emulsion and (2) a monomer soluble organic peroxide polymerization initiator dissolved in vinyl acetate to be polymerized; at least part of the partially hydrolyzed polyvinyl acetate used as the emulsifying agent must have a residual polyvinyl acetate content of between 10% and 30% by weight and a degree of polymerization such that a 4% aqueous solution of the material at 20° C. has a viscosity of at least 50 centipoises.

---

This invention relates to the aqueous emulsion polymerization of vinyl acetate, and more particularly to the preparation of polyvinyl acetate aqueous emulsions having superior adhesive properties.

The polymerization of vinyl acetate in aqueous emulsion, utilizing polyvinyl alcohol or water soluble partially hydrolyzed polyvinyl acetate as emulsifying agent, is an old art, having been described long ago e.g. in 1940 in U.S. Patent 2,227,163 by W. Starck et al.; numerous improvements have been made in the art since that time, but the demand for improved products permits still further improvements in the art of emulsion polymerization of vinyl acetate. Thus Collins in U.S. Patent 2,388,600 described emulsion polymerization utilizing as emulsifier specific combinations of two types of hydrophilic colloids, e.g. two different partially hydrolyzed polyvinyl acetates having different degrees of hydrolysis. Likewise Collins and other inventors have described numerous materials as suitable peroxide initiators for such emulsion polymerizations, including water soluble initiators, e.g. hydrogen peroxide preferably with activators or accelerators such as $FeCl_3$ or $NaHSO_3$, persulfate salts, perborate salts, and alkali peroxides, as well as monomer soluble initiators, e.g. acetyl peroxide, benzoyl peroxide, oleyl peroxide, and dilauryl peroxide.

It has now been found that particularly desirable polyvinyl acetate emulsions having surprisingly superior properties as adhesives can be prepared by the aqueous emulsion polymerization of vinyl acetate using as polymerization initiator a combination of a specific water soluble redox polymerization initiator and a monomer soluble organic peroxide initiator and as emulsfying agent a water soluble partially hydrolyzed polyvinyl acetate having a residual acetate content of between 10% and 30% and a 4% aqueous solution viscosity of at least 50 centipoises or a combination of a partially hydrolyzed polyvinyl acetate as aforesaid with another partially hydrolyzed polyvinyl acetate having substantially the same degree of hydrolysis as aforesaid but having a significantly lower degree of polymerization, i.e. molecular weight, as indicated by its 4% aqueous solution viscosity.

The invention thus consists, in a process for the emulsion polymerization of vinyl acetate in the presence, as emulsifier, of water soluble partially hydrolyzed polyvinyl acetate, of the improvement which comprises polymerizing vinyl acetate monomer in aqueous emulsion using as polymerization initiator a water soluble redox polymerization initiator consisting of hydrogen peroxide and zinc formaldehyde sulfoxylate, together with a monomer soluble organic peroxide polymerization initiator, and using as at least part of the emulsifier a water soluble partially hydrolyzed polyvinyl acetate having a residual polyvinyl acetate content of between 10% and 30% by weight and having a solution viscosity of at least 50 centipoises measured in a 4% aqueous solution at 20° C.

The invention is a variation of the well known "delayed addition" emulsion polymerization procedure, in which procedure a minor initial proportion of monomer to be polymerized together with at least some of the polymerization initiator is dispersed in most of the water to be used in the emulsion to form an initial charge, polymerization is initiated in this initial charge, and as it proceeds the remainder of the monomer to be polymerized, together with the other ingredients required to form the desired emulsion, are gradually added to maintain substantially uniform polymerization conditions until completion of the polymerization.

The invention may be better understood from the following examples, which are illustrative but not limiting of the scope thereof. The percentages mentioned therein and elsewhere throughout this specification are percentages by weight unless otherwise specifically designated.

EXAMPLE 1

This example illustrates a vinyl acetate emulsion polymerization conducted in a 750 imperial gallon (3,400 liter) jacketed kettle equipped with a vented reflux condenser, facilities for cooling and heating by passage of fluid through the jacket, and pumps for feeding ingredients to the kettle. The kettle was charged with an initial charge consisting of:

(1) Water, 240 gal. (1090 liters).
(2) Partially hydrolyzed polyvinyl acetate containing 20% residual polyvinyl acetate and having a solution viscosity in a 4% aqueous solution between 55 and 65 centipoises, 300 lb. (136 kg.).
(3) "Antifoam D 609" (polyvinyl alcohol foam depressant), 1 lb. (454 gm.).
(4) Zinc formaldehyde sulfoxylate, 14.18 lb. (6.44 kg.).
(5) "Santomerse S" (30% aqueous solution of decyl benzene sodium sulfonate surfactant), 20 lb. (9.05 kg.).
(6) Hydrogen peroxide (35 volume), 1120 ml.
(7) Vinyl acetate, 282 lb. (128 kg.).
(8) Dilauryl peroxide (dissolved in foregoing vinyl acetate), 6.75 lb. (3.06 kg.).

The foregoing ingredients were added to the kettle at ambient temperature, about 25° C., with the vinyl acetate containing dilauryl peroxide being added last. On addition of this material, the temperature of the charge rose spontaneously to above 60° C. in a very few minutes, then rose more slowly during the next quarter hour to just above 70° C., after which the slow continuous addition of the delayed ingredients by means of three pumps was started. The delayed ingredients consisted of:

(9) (a) Hydrogen peroxide (35 volume), 5000 ml.
    (b) Water (to form solution of $H_2O_2$), 6 gal. (27.2 liters).
(10) (a) Sodium bicarbonate (buffer), 5 lb. (2.26 kg.).
    (b) Water (to form solution of $NaHCO_3$), 6 gal. (27.2 liters).
(11) Vinyl acetate, 2542 lb. (1151 kg.).

The rate of addition of the delayed vinyl acetate was regulated to being the temperature in the kettle sufficiently high to maintain gentle refluxing as the polymerization proceeded (i.e. about 80–82° C.), with cooling water circulating in the kettle jacket; the rates of addition of the other delayed ingredients were adjusted to complete their additions about half an hour after all the vinyl acetate had been added. Then the kettle contents were heated to 90° C. by means of the jacket and held at this temperature for an hour, with additional sodium bicarbonate being added thereto to raise the pH to 4.5.

The resulting product was a smooth, stable, creamy emulsion free of gritty particles and having a viscosity of 700 poise at 25° C. as measured with a Brookfield viscometer using No. 3 spindle at 20 r.p.m. The emulsion was tested as the adhesive between blocks of wood, in the wood bond strength test hereinafter described, and found to show wood bond strengths of 4000, 3900, and 4100 pounds, averaging 4000 pounds per square inch (281 kg./cm.$^2$).

EXAMPLE 2

This example was carried out using the same equipment used in Example 1, and followed the same general procedure but substituted a different type of partially hydrolyzed polyvinyl acetate for part of the emulsifier. The ingredients and proportions thereof used in preparation of the emulsion were as follows:

Initial charge (1) Water, 240 gal. (1090 liters).
(2) Partially hydrolyzed polyvinyl acetate containing 20% residual polyvinyl acetate and having a solution viscosity in 4% aqueous solution between 4 and 6 cps., 70 lbs. (31.7 kg.).
(3) Partially hydrolyzed polyvinyl acetate containing 30% residual polyvinyl acetate and having a solution viscosity in 4% aqueous solution between 55 and 65 cps., 100 lbs. (45.3 kg.).
(4) "Antifoam D 609" (polyvinyl alcohol foam depressant), 6 ozs. (170 gm.).
(5) Zinc formaldehyde sulfoxylate, 14.2 lbs. (6.44 kg.).
(6) Hydrogen peroxide (35 volume), 1120 ml.
(7) "Santomerse S" (30% aqueous solution of decyl benzene sodium sulfonate surfactant), 20 lbs. (9.05 kg.).
(8) Vinyl acetate, 282 lbs. (128 kg.).
(9) Dilauryl peroxide (dissolved in foregoing vinyl acetate), 6.7 lbs. (3.06 kg.).

The ingredients of this initial charge were added to the polymerization kettle, the vinyl acetate containing dilauryl peroxide being added last. The temperature of the charge rose spontaneously from ambient room temperature to just above 60° C. within a few minutes of the completion of the addition, then continued to rise more slowly to 70° C. during the next quarter hour. At this time simultaneous addition of the following delayed ingredients was started by means of three pumps:

(10) (a) Hydrogen peroxide (35 volume), 5000 ml.
  (b) Water (to form solution of H$_2$O$_2$), 6 gal. (27.2 liters).
(11) (a) Sodium bicarbonate (buffer), 5 lbs. (2.26 kg.).
  (b) Water (to form solution of NaHCO$_3$), 6 gal. (27.2 liters).
(12) Vinyl acetate, 2542 lbs. (1151 kg.).

Polymerization of all the charge was completed as described in Example 1, and was finished in slightly over two and one-half hours. The resulting product was a smooth, stable creamy emulsion free of gritty particles similar to the emulsion of Example 1 but having a viscosity of 220 poise at 25° C. as measured with a Brookfield viscometer using No. 3 spindle at 20 r.p.m. On tests as a wood bond adhesive the emulsion showed strengths of 4100, 4300 and 3900 p.s.i., averaging 4100 p.s.i. (288 kg./cm.$^2$).

EXAMPLE 3

This example shows an emulsion polymerization carried out in accordance with the present invention, in equipment similar to that described in Example 1 but of smaller size. The jacketed kettle in which the polymerization was conducted had a capacity of 40 gallons (182 liters).

The initial charge fed to the kettle consisted of:

(1) Water, 120 lbs. (54.4 kg.).
(2) Partially hydrolyzed polyvinyl acetate containing 20% residual polyvinyl acetate and having a solution viscosity in 4% aqueous solution between 4 and 6 cps., 4.5 lbs. (2.04 kg.).
(3) Partially hydrolyzed polyvinyl acetate containing 20% residual polyvinyl acetate and having a solution viscosity in 4% aqueous solution between 55 and 65 cps., 4.5 lbs. (2.04 kg.).
(4) Zinc formaldehyde sulfoxylate, 322 gm.
(5) Hydrogen peroxide (35 volume), 56 ml.
(6) Santomerse SX (30% alkylaryl sodium sulfonate anionic detergent solution, 1 lb. (0.45 kg.).
(7) Vinyl acetate, 15 lbs. (6.8 kg.).
(8) Dilauryl peroxide (dissolved in foregoing vinyl acetate), 158 gm.

When vinyl acetate containing dilauryl peroxide was added to the other ingredients of the initial charge already in the kettle, the temperature of the charge rose spontaneously from 26° C. to 62° C. in one minute and continued to rise more slowly over the next 15 minutes to 72° C. Thereupon the slow continuous addition of the delayed ingredients to the kettle was started and maintained by three pumps, the delayed ingredients being:

(9) (a) Hydrogen peroxide, 250 ml.
  (b) Water (to form solution of H$_2$O$_2$), 6 lbs. (2.7 kg.).
(10) (a) Sodium bicarbonate (buffer), 114 gm.
  (b) Water (to form solution of NaHCO$_3$), 6 lbs. (2.7 kg.).
(11) Vinylacetate, 145 lbs. (65.8 kg.).

The delayed vinyl acetate was added at a rate which brought the temperature of the ingredients in the reactor to reflux, i.e. about 80–82° C., and this temperature was maintained by application of cooling to the kettle jacket. Addition of the delayed ingredients was completed in one and one half hours, then heating was applied to the kettle jacket to bring the temperature of the kettle contents to 90° C. which was maintained for one hour, after which sufficient sodium bicarbonate was added to the kettle to bring the pH of the contents to 4.5 and the resulting emulsion was discharged to storage at ambient room temperature. The emulsion was a smooth, grit-free, creamy emulsion having a viscosity of 300 poise at 25° C. as measured with a Brookfield viscometer using No. 3 spindle at 20 r.p.m.

On testing as a wood bond adhesive, the emulsion was found to have wood bond strength of 3900, 4300, and 4100 p.s.i., averaging 4100 p.s.i. (288 kg./cm.$^2$).

EXAMPLE 4

The preceding Examples 1–3 illustrate the use of partially hydrolyzed polyvinyl acetate emulsifier in the preparation of adhesive emulsions in which the proportions of such emulsifier which are partially hydrolyzed polyvinyl acetate having a solution viscosity in 4% aqueous solution between 55 and 65 cps. are 100%, 59%, and 50% respectively. The present example illustrates the preparation of an adhesive emulsion using the same procedure and total amounts of ingredients as was used in Example 3, in particular the total amount of partially hydrolyzed polyvinyl acetate emulsifier being the same, but the proportion of the emulsifier which has a solution viscosity between 55 and 65 cps. in 4% aqueous solution is only 1% of the total amount of the emulsifier. An emulsion was prepared in this manner and it was similar to that of Example 3, viz: a stable, smooth, creamy emulsion free of gritty particles, but it had a viscosity of only 62 poises, measured as described above. The lower viscosity of the emulsion is a result of the use of a low proportion of partially hydrolyzed polyvinyl acetate emulsifier having the high degree of polymerization. Most significant however is the fact that the emulsion is free of gritty particles even with such a low proportion as 1% of the total emulsifier in the form of the material having a solution viscosity between 55 and 65 cps. in 4% aqueous solution.

The criticality of the presence of at least some proportion of the emulsifier material having the high degree of polymerization in the emulsion is demonstrated by comparison with a similar emulsion which was prepared with the same quantities of ingredients as that in the foregoing Example 4, but omitting the small proportion of the partially hydrolyzed polyvinyl acetate having the high degree of polymerization and using in lieu thereof only an equal amount of the partially hydrolyzed polyvinyl acetate of the lower degree of polymerization. The resulting emulsion was an emulsion which inherently was unsuitable for use as wood adhesive because of a large proportion of grits or large gritty particles therein. The proportion of grits was determined by diluting a one gram sample of the emulsion in 50 ml. water, filtering the diluted dispersion through a No. 1 Whatman filter paper, then drying and weighing the particles retained on the filter paper. In tests on three samples of the unsuitable emulsion the samples were found to contain respectively 8.95%, 9.05% and 9.03%, averaging 9.01% of gritty particles based on the weight of the total emulsion. This is in sharp contrast to the emulsion prepared in accordance with the present invention in Example 4 and containing the small proportion (1%) of the emulsifier having the high degree of polymerization; one gram samples of the emulsion of Example 4, diluted with 50 ml water, gave no weighable residue on filtration through a No. 1 Whatman filter paper.

The wood bond strength test referred to above is carried out using two pieces of smooth planed maple hardwood measuring 1 inch x 1¼ inch x ½ inch. They are coated on surfaces 1 inch by 1 inch with the emulsion to be tested. The two coated pieces are brought into contact so that the area of contact between them is just the coated one square inch, and they are held together for one minute under finger pressure while excess emulsion squeezed out from the area under contact is removed with a spatula. The test pieces are then allowed to remain in contact at room temperature for three days after which they are sheared by force applied by an hydraulic press at the edge of the blocks along the plane of the adhesive joint. The total force required to shear the blocks apart is recorded as the wood bond strength in pounds per square inch.

Although it is not possible to assert any specific explanations for the superior wood bond adhesive strength and other properties of the emulsion compositions of the present invention, some factors affecting these properties are recognizable and indicative of the criticality of the limitations of the invention. The first desirable property of a good adhesive is of course good bond strength. The results of the wood bond strength tests in the foregoing examples demonstrate the superiority of the emulsions made in accordance with the present invention, particularly when it is noted that prior art vinyl acetate homopolymer emulsions made with partially hydrolyzed polyvinyl acetate as emulsifier have wood bond strengths in the range around 2000–3000 p.s.i. A second desirable property of an aqueous emulsion adhesive for many applications is a high viscosity, which permits the adhesive to be spread as a thick film, on a surface to be adhesively secured, without the adhesive rapidly spreading and flowing off the surface to which it is applied. The use of a partially hydrolyzed polyvinyl acetate of high degree of polymerization in this invention, i.e. one having a solution viscosity of at least 50 cps. measured on 4% aqueous solution, imparts high viscosity to the emulsions of the invention, generally in proportion to the proportion of the emulsifier of high degree of polymerization relative to the total amount of emulsifier used. As in conventional polyvinyl acetate emulsion preparation using partially hydrolyzed polyvinyl acetate as the emulsifier, the total amount of emulsifier used in this invention is normally between about 2% and 6% by weight of the emulsion, although larger or smaller proportions can be used in particular circumstances. The use of only a small proportion of material of high degree of polymerization in the total amount of emulsifier in this invention produces emulsions of relatively low viscosity, as is shown in Example 4. By the use of material of high degree of polymerization only as the emulsifier, it is possible according to this invention to obtain emulsions of viscosities of 700–1000 poises, as shown in part in Example 1. It can be noted at this point that emulsion products of viscosities in the range around 1000 poises are practical compositions for use in commerce, being usable and applicable with appropriate common commercial equipment. Compositions in the form of stiff gels, e.g. having viscosities of the order of 3000–4000 poises or more, are of course entirely unsuitable as adhesive emulsions.

A significant factor among others affecting the viscosity of polyvinyl acetate emulsions made with partially hydrolyzed polyvinyl acetate having a high degree of polymerization as emulsifier has been found to be the nature of the initiator used in the preparation of the emulsions. It has been observed that in emulsion polymerizations using some initiator systems, other than those used in the process of the invention described herein, and using partially hydrolyzed polyvinyl acetate emulsifier having a solution viscosity of at least 50 centipoises measured in 4% aqueous solution at 20° C., the emulsion products become so thick and viscous that they congeal to stiff gels which are useless as adhesive emulsions. Thus a redox initiator system consisting only of hydrogen peroxide oxidant and a sulfoxylate activator, omitting the organic peroxide initiator used in the present invention but otherwise utilizing all the ingredients thereof, produces emulsions which may become so viscous that they set to stiff gels before the polymerizations are complete.

The nature of the initiator system used in the present invention is critical not only because of its effect on the viscosity of the emulsions made thereby but also because of its effect on the wood bond strength of such emulsions. Thus if one substitutes a water soluble persulfate salt for the hydrogen peroxide required by the present invention, conventional emulsions suitable as adhesives may be obtained; however they do not have the surprising superior wood bond strength of the emulsions of the present invention, but only the strength of conventional polyvinyl acetate emulsion adhesives. Likewise if one substitutes alkali metal formaldehyde sulfoxylate, e.g. sodium formaldehyde sulfoxylate, for the zinc formaldehyde sulfoxylate required by the present invention, emulsions suitable as conventional emulsions may be obtained but they likewise lack the superior wood bond strength of the emulsions of the present invention, i.e. their wood bond strengths are about 2500 p.s.i. and not in the range around 4000 p.s.i. characteristic of the emulsions of the present invention. The proportions of the polymerization initiators that are suitable for this invention are not critical, and vary within the range of the proportions of such initiators normally used in emulsion polymerizations. Thus the redox initiator system containing hydrogen peroxide and zinc formaldehyde sulfoxylate, usually in approxiamately equimolar proportions, is used in amounts of between 0.05% and 0.005%, preferably about 0.01% by weight of the vinyl acetate monomer to be polymerized, while the monomer soluble organic peroxide initiator is used in amounts between 0.01% and 0.001% preferably about 0.003% by weight of the vinyl acetate monomer to be polymerized.

Numerous modifications can be made in the invention, as illustrated by the examples, for various purposes. Thus a proportion of a wetting agent or surfactant is included in the emulsions described in the examples to enable the emulsions to be diluted to a suitable extent with water without at the same time greatly decreasing the viscosity of the emulsions. However the presence of such wetting agent or surfactant in the emulsions is not essential to the invention and satisfactory emulsions can be made according to the invention without the inclusion of such wetting agents or surfactants. Likewise, the proportion of sodium bicarbonate, included in the examples as a buffering agent to inhibit hydrolysis of vinyl acetate during the polymerization, is not critical and can be omitted or replaced by proportions of other materials well known in the art as buffering agents in the aqueous emulsion polymerization of vinyl acetate. Similarly, other monomer soluble organic peroxides, for example acetyl peroxide, benzoyl peroxide, and oleyl peroxide, can be substituted for the lauryl peroxide used in the examples within the scope of the invention.

Although equivalents for the zinc formaldehyde sulfoxylate for use in the invention have not been shown, it is believed that formaldehyde sulfoxylate compounds of polyvalent metals other than zinc would be suitable, but no such compounds are available commercially at present. It has already been indicated herein that formaldehyde sulfoxylate compounds of monovalent metals, e.g. sodium formaldehyde sulfoxylate, are not equivalent to the zinc compound for purposes of this invention. It is of course entirely unexpected that the valence of the metal cation of an ingredient in the initiator composition should have such a critical effect on the adhesive strength of the emulsion polymerized by the initiator.

Despite the criticality of the factors hereinbefore mentioned regarding various features of the invention, numerous other modifications may be made in the specific expedients described without departing from the scope of the invention which is set out in the following claims.

What is claimed is:

1. In a process for the emulsion polymerization of vinyl acetate in the presence, as emulsifier, of a water soluble partially hydrolyzed polyvinyl acetate, the improvement which comprises polymerizing vinyl acetate monomer in aqueous emulsion with, as polymerization initiator, a combination of (1) a water soluble redox polymerization initiator consisting of hydrogen peroxide and zinc formaldehyde sulfoxylate together with (2) a monomer soluble organic peroxide polymerization initiator, and, as emulsifier, partially hydrolyzed polyvinyl acetate having a residual polyvinyl acetate content of between 10% and 30% by weight with at least part of said emulsifier having a solution viscosity of at least 50 centipoises measured in a 4% aqueous solution at 20° C.

2. In a process as claimed in claim 1, the improvement in which the said water soluble redox polymerization initiator and organic peroxide polymerization initiator are added to an initial charge comprising part of the vinyl acetate to be polymerized, and additional hydrogen peroxide is added along with the remainder of the vinyl acetate to be polymerized as polymerization proceeds at the reflux temperature of the charge.

3. In a process as claimed in claim 1 or 2, the improvement in which the monomer soluble organic peroxide polymerization initiator is lauryl peroxide, acetyl peroxide, benzoyl peroxide, or oleyl peroxide.

4. In a process as claimed in claim 1, the improvement in which the emulsifier is partially hydrolyzed polyvinyl acetate having a residual polyvinyl acetate content of 20% and a solution viscosity of between 55 and 65 centipoises measured in a 4% aqueous solution at 20° C.

5. In a process as claimed in claim 1, the improvement in which the emulsifier is partially hydrolyzed polyvinyl acetate having a residual acetate content of 20% and in which part of said emulsifier has a solution viscosity between 55 and 65 centipoises measured in a 4% aqueous solution at 20° C. and the remainder of said emulsifier has a solution viscosity of between 4 and 6 centipoises measured as aforesaid.

6. In a process as claimed in claim 4 or 5, the improvement in which the emulsifier used is between 2% and 6% by weight of the emulsion.

7. In a process as claimed in any of claims 2, 4, and 5, the improvement in which the water soluble redox polymerization initiator amounts to between 0.05 and 0.005% by weight of the vinyl acetate to be polymerized and the organic peroxide polymerization initiator amounts to between 0.01% and 0.001% by weight of the vinyl acetate to be polymerized.

8. A process for the polymerization of vinyl acetate in aqueous emulsion in the presence of water soluble partially hydrolyzed polyvinyl acetate as emulsifier characterized in that the polymerization initiator used is a combination of (1) a water soluble redox polymerization initiator consisting of hydrogen peroxide and zinc formaldehyde sulfoxylate and (2) a monomer soluble organic peroxide polymerization initiator, and that the water soluble partially hydrolyzed polyvinyl acetate emulsifier has a residual polyvinyl acetate content of between 10% and 30% by weight and at least part of it has a solution viscosity of at least 50 centipoises measured in a 4% aqueous solution at 20° C.

9. In a process for the polymerization of vinyl acetate in aqueous emulsion with water soluble partially hydrolyzed polyvinyl acetate as the emulsifier, in which process (a) there is formed an initial charge comprising
   (1) the emulsifier dissolved in
   (2) a major part of the water for the emulsion,
   (3) a minor part of the vinyl acetate to be polymerized, and
   (4) a part of the polymerization initiator to initiate the polymerization, and
(b) the remainder of the vinyl acetate to be polymerized, the remainder of the water for the emulsion, and the remainder of the polymerization initiator are gradually added to the initial charge at rates to maintain substantially uniform polymerization conditions until completion of the polymerization, the improvement which comprises (A) adding to the water of the initial charge a water soluble partially hydrolyzed polyvinyl acetate having a residual polyvinyl acetate content of between 10% and 30% by weight and having a solution viscosity of at least 50 centipoises measured in a 4% aqueous solution at 20° C., to form at least part of the emulsifier in the emulsion, (B) adding to the water of the initial charge a portion of a polymerization initiator which is a water soluble redox system consisting of hydrogen peroxide and zinc formaldehyde sulfoxylate, (C) adding to the minor part of the vinyl acetate, before it is added to the initial charge, a soluble organic peroxide polymerization initiator to form part of the polymerization initiator for the polymerization, and (D) continuing the addition of hydrogen peroxide as the remainder of the polymerization initiator while the remainder of the vinyl acetate to be polymerized is added to the initial charge to complete the polymerization.

10. In a process as claimed in claim 9, the improvement in which the remainder of the vinyl acetate to be polymerized is added to the initial charge at a rate to maintain refluxing as the polymerization proceeds.

11. The polyvinyl acetate emulsion product made directly by the improved emulsion polymerization process claimed in claim 1, said emulsion product having (1) a viscosity at 25° C. as measured with a Brookfield viscometer using No. 3 spindle at 20 r.p.m. of at least 62 poises and (2) a wood bond strength along the plane of an adhesive joint between two smooth planed maple hardwood surfaces, after drying at room temperature for three days, of more than 3000 pounds per square inch.

References Cited

UNITED STATES PATENTS

| 2,565,783 | 8/1951 | Schouteden et al. | 260—89.1 |
| 2,965,623 | 12/1960 | Wechsler et al. | 260—89.1 |
| 3,010,929 | 11/1961 | Jones. | |

MURRAY TILLMAN, Primary Examiner

W. J. BRIGGS, Sr., Assistant Examiner

U.S. Cl. X.R.

260—89.1, 875